3,268,406
COMPOSITIONS AND METHOD OF USING (3-AMINO-PYRAZINOYL) GUANIDINES
Edward J. Cragoe, Jr., Lansdale, and Philip L. Southwick, Pittsburgh, Pa., assignors to Merck & Co., Inc., Rahway, N.J., a corporation of New Jersey
No Drawing. Filed May 24, 1963, Ser. No. 282,861
7 Claims. (Cl. 167—65)

This application is a continuation-in-part of United States application, Serial No. 144,556, filed October 12, 1961, now abandoned.

This invention is concerned with (3-aminopyrazinoyl) guanidine compounds having at least one halogen or halogen-like substituent attached to the pyrazine nucleus.

It has been found that the (3-aminopyrazinoyl)guanidines of this invention possess natriuretic properties. They differ from most of the known, effective diuretic agents, however, in that the compounds of this invention selectively enhance the excretion of sodium and chloride ions while at the same time they do not cause an increase of excretion of certain other ions such as potassium and calcium.

It has also been found an another feature of this invention that the novel (3-aminopyrazinoyl)guanidines, when co-administered with other diuretic agents known to enhance the elimination of potassium ions along with sodium and chloride ions, will reduce the excretion of potassium ions and thus overcome this undesirable property of many dieuretic agents. The compounds of this invention therefore are additionally useful in combination with other classes of diuretic agents to prevent the loss of potassium which they otherwise would cause to be eliminated, as well as being useful by themselves as diuretic and/or saluretic agents.

It has additionally been found by our collaborators that the aminopyrazinoylguanidine compounds of this invention do not increase the excretion of calcium and, in fact, they will prevent excessive excretion of calcium ions. Prevention of calcium excretion is effected by the products of this invention whether calcium excretion is drug induced or whether induced by a malfunction of the adrenal glands or other mechanism which causes an increase in the excretion of this ion.

The products of this invention can be administered to man or other animals in unit dosage form in pills, tablets, capsules, injectible preparations and the like and can comprise the only essential active ingredient of a pharmaceutical formulation for modifying the excretion pattern of electrolytes, particularly sodium, chloride, potassium and calium ions. The products of this invention also can be combined in a pharmaceutical formulation with other diuretic agents as other diuretics of the thiazide type such as chlorothiazide, hydrochlorothiazide, flumethazide, hydroflumethazide, trichloromethazide or diuretics such as acetazolamide or other diuretics in order to reduce the excretion of potassium ions caused by these diuretics.

The compounds of this invention can be administered either alone or combined with other therapeutic agents. The (aminopyrazinoyl)guanidines can be administered at a dosage range of from about 25 mg./day to about 250 mg./day or at a somewhat higher or lower dosage at the physician's discretion, preferably on a 1 to 3 times a day regimen.

The pyrazinoylguanidine compounds of this invention therefore are primarily useful in modifying the excretion pattern of certain ions in an animal organism. Because of this property they are useful in the treatment of a multiplicity of conditions resulting from either an increase or a decrease in the electrolyte concentration in an animal organism such as in the treatment of edema, hypertension and other pathological conditions known to be caused by an excessive retention or excessive elimination of certain electrolytes.

The preferred novel compounds of this invention are (3-aminopyrazinoyl)guanidine compounds having at least one halogen or halogen-like substituent attached to the pyrazine nucleus, particularly a chlorine, bromine, fluorine, iodine, trihalomethyl as trifluoromethyl, trichloromethyl, and similar halogen-like radicals. Where the substituent, halogen, is referred to in this disclosure and claims it is to be understood to mean halogen or halogen-like radicals and to embrace all of the radicals just identified.

(Aminopyrazinoyl)guanidines which have been found to be especially useful in selectively enhancing sodium, chloride or sodium chloride excretion while preventing an enhanced excretion of potassium and calcium ions are (3 - amino - 6-halogenopyrazinoyl)guanidines and among these compounds, (3-amino-6-bromopyrazinoyl) guanidine and (3-amino-6-chloropyrazinoyl)guanidine are particularly effective in modifying the electrolyte excretion pattern of the animal organism.

One method by which the (3-aminopyrazinoyl)guanidine compounds of this invention are prepared involves halogenating esters of 3-aminopyrazinoic acids to introduce the halogen into the pyrazine nucleus and then reacting the halogenated esters with guanidine to form the acylguanidine compound. Halogenation advantageously is effected in the presence of water or an acid such as a mineral acid as hydrochloric acid, hydrobromic acid and the like or acetic acid or a mixture of water and an acid such as a mineral acid, acetic acid or dimethylformamide. Such a halogen be introduced simultaneously on the 3-amino group, this can readily be removed by the interaction of the product with a bisulfite such as an alkali metal bisulfite. The halogenated 3-aminopyrazinoic acid ester then is reacted with guanidine preferably under anhydrous conditions and either with or without a solvent such as methanol, ethanol, isopropyl alcohol, dioxane, tetrahydrofuran, 2-methoxyethanol or other solvents to form the (halogenated-3-aminopyrazinoyl)guanidine products of this invention.

A second method of synthesis of compounds of this invention involves the halogenation of (3-aminopyrazinoyl)guanidine; the preparation of the (3-aminopyrazinoyl)guanidine and the halogenation being carried out by the methods described above.

Some of the compounds which can be prepared according to one or both of these methods are:
(3-amino-6-bromopyrazinoyl)guanidine and
(3-amino-6-chloropyrazinoyl)guanidine.

Other methods for preparing (halogenated-aminopyrazinoyl)-guanidines are described below in connection with the preparation of other compounds of this invention.

Methyl 3-amino-6-iodopyrazinoate is prepared by treating methyl 3-aminopyrazinoate with mercuric acetate and iodine.

Methyl 3-amino-6-fluoropyrazinoate is synthesized by reacting 2-amino-3-methyl-5-iodopyrazine with sodium fluoride to give 2-amino - 3 - methyl-5-fluoropyrazine. Treatment of this material with acetic anhydride produces 2-acetamido - 3 - methyl-5-fluoropyrazine which upon potassium permanganate oxidation followed by hydrolysis gives 3-amino-6-fluoropyrazinoic acid. Esterification with methanol affords the corresponding methyl ester.

3-amino-5-hydroxypyrazinoic acid can be prepared from either ethyl 4-aminouracil-5-azomethinecarboxylate or from 2,4,7-trihydroxypteridine by treatment with aqueous alkali. Treatment of 3-amino-5-hydroxypyrazinoic acid with methanol and acid as hereinbefore described gives methyl-3-amino-5-hydroxypyrazinoate. The interaction of methyl 3-amino-5-hydroxypyrazinoate with phosphorus oxychloride and phosphorus pentachloride or phosphorus oxybromide and phosphorus pentabromide, with or without the addition of a tertiary amine, such as diethylaniline produces, respectively, methyl 3-amino-5-chloropyrazinoate and methyl 3-amino - 5 - bromopyrazinoate.

Heating 1,1,1-trifluoro-3,3-dibromoacetone with aqueous sodium acetate, cooling and treating the product with aminomalonamidamine gives 3-amino-6-trifluoromethylpyrazinamide. The amide gives on mild hydrolysis, 3-amino-6-trifluoromethylpyrazinoic acid which is converted to the corresponding methyl ester by the usual procedure.

The interaction of each of the above methyl esters with guanidine by the methods described above produces the corresponding (5- or 6-substituted-3-aminopyrazinoyl)guanidines, that is (3-amino-6-iodopyrazinoyl)guanidine,
(3-amino-6-fluoropyrazinoyl)guanidine,
(3-amino-5-chloropyrazinoyl)guanidine,
(3-amino-5-bromopyrazinoyl)guanidine,
(3-amino-6-trifluoromethylpyrazinoyl)guanidine.

The acid salts of the (halogenated 3-aminopyrazinoyl)-guanidine compounds can be prepared by any suitable, known method such as by suspending the (halogenated 3-aminopyrazinoyl)guanidine in water and adding the desired acid while warming slightly to effect solution. The acid addition salt often crystallizes upon cooling the reaction mixture to about 5° C. and can be separated by filtration. The pharmaceutically acceptable, essentially non-toxic acid addition salts are considered the equivalent of the free bases for the purpose of this invention.

The following examples are illustrative of the methods by which the products of this invention can be prepared and are not to be considered as limiting the invention to the particular procedural conditions employed or to the particular compounds prepared thereby.

EXAMPLE 1.—(3-AMINO - 6 - CHLOROPYRAZINOYL)GUANIDINE

*Step A.—methyl 3-amino-6-chloropyrazinoate*

A 5-liter, 3-necked flask equipped with a mechanical stirrer, thermometer and gas inlet tube is charged with a warm (about 38° C.) mixture of water (3180 ml.) and glacial acetic acid (750 ml.) and methyl 3-aminopyrazinoate (90 g., 0.588 mole) then is added. The stirrer is started and the mixture heated to 41° C. which causes nearly all the ester to dissolve. The solution then is cooled to just below 40° C. via an ice bath. With vigorous stirring, chlorine (about 140 g.) is passed through the solution over a period of 25 minutes. A precipitate begins to form after five minutes and becomes quite voluminous by the end of the reaction. The temperature drops to 20–25° C. during the reaction. The nearly white precipitate, which is methyl 3-chloroamino-6-chloropyrazinoate, is removed by filtration and washed with a small amount of ice water. A small amount of this material, when recrystallized from warm acetic acid, melts at 142° C. (dec.)

*Analysis.*—Calculated for $C_6H_5Cl_2N_3O_2$: C, 32.46; H, 2.27; N, 18.93; Cl (total), 31.94, Cl (active), 15.97. Found: C, 32.82; H, 2.34; N, 18.90; Cl (total), 32.09, Cl (active), 16.06.

The moist methyl 3-chloroamino-6-chloropyrazinoate and a solution of sodium bisulfite (150 g.) in water (900 ml.) are placed in a 4-liter beaker and stirred mechanically for one-half hour. The temperature of the mixture is maintained at 25° C. by addition of ice. The light yellow methyl 3-amino-6-chloropyrazinoate is removed by filtration, suspended in 150 ml. of ice water and filtered. This process is repeated twice with 150 ml. portions of ice water and once with a 50 ml. portion of cold isopropyl alcohol. After drying in the air there is obtained 60 g. (55%) of methyl 3-amino-6-chloropyrazinoate M.P. 159–161° C.

*Analysis.*—Calculated for $C_6H_8ClN_3O_2$: C, 38.42; H, 3.22; N, 22.40; Cl, 18.90. Found: C, 38.81; H, 3.54; N, 22.83; Cl, 18.39.

*Step B.—Preparation of (3-amino-6-chloropyrazinoyl) guanidine*

A 3-liter, 3-necked flask, fitted with a mechanical stirrer, thermometer and gas inlet tube is charged with absolute alcohol (1815 ml.) and then flushed with dry nitrogen. Clean sodium (13.6 g., 0.59 mole) is introduced and the hydrogen allowed to escape through a bubbler to maintain a dry atmosphere. After the sodium dissolves, guanidine hydrochloride (0.67 mole) is added to the solution while maintaining a nitrogen atmosphere. The mixture is stirred for several minutes during which the guanidine hydrochloride dissolves and sodium chloride separates. Methyl 6-chloro-3-aminopyrazinoate (51.5 g., 0.274 mole) is added and the stirring mixture heated to 60° C. then allowed to cool spontaneously to room temperature over a period of 2 hours. The mixture then is cooled to 18° C., filtered and the residue washed with absolute alcohol and air dried. This product is a mixture of (3-amino-6-chloropyrazinoyl)guanidine and sodium chloride. This material is suspended in water (5440 ml.) at 60° C. and the pH adjusted to 3 by adding 2.5 N hydrochloric acid (about 115 ml.) with vigorous stirring. A small amount of insoluble material is removed by filtration and the clear yellow filtrate stirred and adjusted to pH 8 with 5% aqueous sodium hydroxide (about 200 ml.). While stirring, the suspension is cooled to 18° C., filtered and the residue washed with water until the alkali is removed. After drying in the air the yield of bright yellow (3-amino-6-chloropyrazinoyl)guanidine is 50.7 g. (86%), M.P. 238° C. (dec.).

*Analysis.*—Calculated for $C_6H_7ClN_6O$: C, 33.58; H, 3.29; N, 39.16. Found: C, 33.60; H, 3.39; N, 39.04.

EXAMPLE 2.—(3-AMINO-6-CHLOROPYRAZINOYL)GUANIDINE HYDROCHLORIDE (3-amino-6-chloropyrazinoyl)guanidine (2 g., 0.0093 mole) is suspended in water (60 ml.), the mixture stirred and 6 N hydrochloric acid added dropwise until the solution tests slightly acid as measured by "alkacid" paper. The mixture is warmed slightly to effect solution, filtered and 6 N hydrochloric acid (4 ml.) added to the filtrate. The solution then is cooled to 5° C. in a salt-ice mixture and the yellow crystalline product removed by filtration. After drying, there is obtained 2.2 g. (96%) of (3-amino-6-chloropyrazinoyl)guanidine hydrochloride, M.P. 286° C. (dec.) when inserted in a bath preheated to 282° C. and heating at a rate of 1° C./5 sec.

*Analysis.*—Calculated for $C_6H_8Cl_2N_6O$: C, 28.70; H, 3.21; N, 33.47; Cl, 28.24. Found: C, 28.89; H, 3.21; N, 33.72; Cl, 28.22.

EXAMPLE 3.—(3-AMINO-6-BROMOPYRAZINOYL) GUANIDINE

A dry 200 ml. round-bottom flask, fitted with a mechanical stirrer, gas-inlet tube and reflux condenser protected with a drying tube is flushed with dry nitrogen and absolute methanol (35 ml.) is added. Clean sodium (0.46 g., 0.02 mole) is introduced and as soon as the reaction terminates guanidine hydrochloride (1.9 g., 0.02 mole) in methanol (35 ml.) is added. After stirring for 10 minutes, methyl 3-amino-6-bromopyrazinoate (4.6 g., 0.02 mole) is added and the mixture stirred and refluxed on a steam bath for 30 minutes. After stirring for an additional hour at room temperature, the stirred reaction mixture is treated with water (150 ml.). The solid product that separates is removed by filtration, washed with a little water and dried at room temperature. The crude (3-amino-6-bromopyrazinoyl)guanidine obtained is suspended in water (30 ml.), stirred and adjusted to pH 3 by the addition of 3 N hydrochloric acid. After warming the mixture to 50° C. a slight amount of insoluble material is removed by filtration and the clear yellow filtrate is stirred and adjusted to pH 8 by the addition of 3 N sodium hydroxide. The bright yellow (3-amino-6-bromopyrazinoyl)guanidine then is removed by filtration. The filter cake is reduced to fine particle size, suspending in water, filtered and dried at room temperature yielding 2.6 g. (52%) of product M.P. 234–234.5° C. (dec.).

*Analysis.*—Calculated for $C_6H_7BrN_6O$: C, 27.82; H, 2.72; N, 32.44. Found: C, 27.99; H, 2.90; N, 31.98.

Alternate methods for preparing the product of Example 3, which also can be employed for the preparation of other pyrazinoylguanidine compounds of this invention are described in the following Examples 4–6.

EXAMPLE 4.—(3-AMINO-6-BROMOPYRAZINOYL)GUANIDINE

Dry guanidine (0.1 mole) is prepared by dissolving clean sodium (2.3 g., 0.1 mole) in dry methanol (50 ml.) and adding dry guanidine hydrochloride (9.6 g., 0.1 mole) as described above in Example 3. The sodium chloride that separates is removed by filtration under anhydrous nitrogen and the methanol then is removed from the filtrate by distillation in vacuo.

Methyl-3-amino-6-bromopyrazinoate (4.64 g., 0.02 mole) that has been pulverized and thoroughly dried is added to the guanidine and the mixture heated on a steam bath for 5 to 6 minutes under anhydrous conditions, then quickly cooled and triturated with water (70 ml.). The product is removed by filtration, washed with a little water and dried in air to yield 4.55 g. (88%), of (3-amino-6-bromopyrazinoyl)guanidine, M.P. 231–231.5° C. (dec.). This material when reprecipitated by formation of the soluble hydrochloride salt followed by treatment with sodium hydroxide as described in Example 3 gives 4.0 g. (78%) of product, M.P. 234–234.5° C. (dec.).

EXAMPLE 5.—(3-AMINO-6-BROMOPYRAZINOYL)GUANIDINE

*Step A.—Preparation of (3-aminopyrazinoyl)guanidine*

A solution of guanidine (0.02 mole) is prepared by dissolving clean sodium (0.46 g., 0.02 mole) in dry isopropyl alcohol (40 ml.) under anhydrous conditions in an atmosphere of dry nitrogen. Guanidine hydrochloride (2.0 g., 0.021 mole) is added and the mixture stirred for 10 minutes. The sodium chloride that forms is filtered off under anhydrous conditions and the filtrate treated with methyl 3-aminopyrazinoate (3.06 g., 0.02 mole). After stirring for 1½ hours under anhydrous conditions in an atmosphere of dry nitrogen, the yellow solid that separates is removed by filtration and dried to give 2.2 g. (61%) of (3-aminopyrazinoyl)guanidine M.P. 193–4° C. (dec.). Recrystallization from isopropyl alcohol gives material melting at 200–202° C. (dec.).

*Analysis.*—Calculated for $C_6H_8ON_6$: C, 40.00; H, 4.48; N, 46.65. Found: C, 40.24; H, 4.59; N, 46.70.

*Step B.—Preparation of (3-amino-6-bromopyrazinol)guanidine*

(3-aminopyrazinoyl)guanidine (1.6 g., 0.0089 mole) is placed in a 100 ml., 3-necked flask fitted with a thermometer, mechanical stirrer and dropping funnel. The solid is suspended in water (50 ml.), the stirrer started and 2.5 N hydrobromic acid added dropwise until the solid dissolves. Bromine (1.6 g., 0.01 mole), dissolved in glacial acetic acid (5 ml.), is added dropwise to the stirring solution over a 15 minute period while the temperature is maintained at 25° C. After stirring another 15 minutes, the solution is adjusted to pH 8 with 10N sodium hydroxide and the crude product is reprecipitated as described in Example 3 to give pure (3-amino-6-bromopyrazinoyl)guanidine, M.P. 234–234.5° C. (dec.), yield 1.5 g. (65%).

EXAMPLE 6.—(3-AMINO-6-BROMOPYRAZINOYL)GUANIDINE

*Step A.—Preparation of (3-aminopyrazinoyl)guanidine*

Dry guanidine (0.04 mole) is prepared by dissolving clean sodium (0.92 g., 0.04 mole) in dry methanol (20 ml.) followed by the addition of guanidine hydrochloride (3.84 g., 0.04 mole) and the sodium chloride formed is removed by filtration in an atmosphere of anhydrous nitrogen and then the methanol is removed from the filtrate by distillation in vacuo. Methyl 3-aminopyrazinoate (3.06 g., 0.02 mole) is added to the residual guanidine and the mixture warmed on a steam bath for 3 to 5 minutes. After cooling the reaction mixture, triturating with water and purifying as described in Example 5, Step A, there is obtained 1.6 g. (44%) of (3-aminopyrazinoyl)guanidine, M.P. 200–202° C.

*Step B.—Preparation of (3-amino-6-bromopyrazinoyl)guanidine*

(3-aminopyrazinoyl)guanidine 1.6 g. (0.0089 mole) is brominated by the method described in Example 5, Step B, yielding pure (3-amino-6-bromopyrazinoyl)guanidine, M.P. 234–234.5° C. (dec.).

EXAMPLE 7.—(3-AMINO-6-BROMOPYRAZINOYL)GUANIDINE HYDROCHLORIDE (3-amino-6-bromopyrazinoyl)guanidine (500 mg., 0.0019 mole) is suspended in water (20 ml.) and a few drops of 6 N hydrochloric acid added. The suspension then is warmed to 50° C. with stirring to effect solution, the solution then filtered and the filtrate treated with more 6 N hydrochloric acid (1 ml.) and cooled to 5° C. (3-amino-6-bromopyrazinoyl)guanidine hydrochloride separates as yellow needles, yield 500 mg., M.P. 265° C. (dec.).

*Analysis.*—Calculated for $C_6H_8BrClN_6O$: C, 24.38; H, 2.73; Br, 27.03; Cl, 12.00. Found: C, 24.01; H, 3.13; Br, 26.73; Cl, 11.67.

EXAMPLE 8.—(3-AMINO-6-IODOPYRAZINOYL)GUANIDINE

*Step A.—Preparation of methyl 3-amino-6-iodopyrazinoate*

Methyl 3-aminopyrazinoate (30.6 g., 0.2 mole) is suspended in 500 cc. of water. Mercuric acetate (39.8 g., 0.125 mole) is added, and the mixture stirred and heated on the steam bath while a solution of 50.8 g. (0.2 mole) of iodine in 250 cc. of warm dioxane is rapidly added. The reaction mixture is stirred and heated for 40 minutes and then cooled and poured into 600 cc. of a 15% solution of potassium iodide in water. The solid product which precipitates is collected and recrystallized from 150 cc. of acetic acid to give 13.5 g. of methyl 3-amino-6-iodopyrazinoate, M.P. 199–201.5° C. A small sample recrystallized for analysis had M.P. 200–202° C.

*Analysis.*—Calculated for $C_6H_6IN_3O_2$: C, 25.82; H, 2.17; N, 15.06; I, 45.48. Found: C, 26.18; H, 2.14; N, 14.81; I, 44.89.

*Step B.—Preparation of (3-amino-6-iodopyrazinoyl)guanidine*

Guanidine hydrochloride (5.0 g., 0.052 mole) is added to a solution of 1.0 g. (0.044 mole) of sodium in 20 cc. of methanol. The methanol is removed by vacuum distillation and 2.8 g. (0.01 mole) of methyl 3-amino-6-iodopyrazinoate added. The thick mixture is stirred for 30 minutes at room temperature during which time it sets to a heavy paste. Ice water then is added and the insoluble product collected and dissolved in a mixture of 20 cc. of 5% hydrochloric acid and 60 cc. of water. The solution is filtered, treated with 5 cc. of concentrated hydrochloric acid and chilled to precipitate the hydrochloride salt of the product. This salt is collected and dissolved in 60 cc. of warm water, filtered and made basic with 5% sodium hydroxide solution, whereupon (3-amino-6-iodopyrazinoyl)guanidine separates in pure condition, M.P. 226–227° C. (dec.).

*Analysis.*—Calculated for $C_6H_7IN_6O$: C, 23.54; H, 2.31; N, 27.46; I, 41.46. Found: C, 23.68; H, 2.27; N, 27.19; I, 41.30.

EXAMPLE 9.—(3-AMINO-6-TRIFLUORO-METHYLPYRAZINOYL)GUANIDINE

Step A.—Preparation of 3-amino-6-trifluoromethylpyrazinamide

A mixture of 1,1,1-trifluoro-3,3-dibromopropanone (97.83 g.; 0.363 mole), sodium acetate trihydrate (98.60 g.; 0.725 mole) and water (305 ml.) is heated, with stirring, to 100° C. over a period of 20 minutes. After maintaining the temperature at 100° C. for an additional 5 minutes, the reaction solution is immediately chilled to 0° C. in an ice bath. This solution is added to a solution of aminomalonamidamidine dyhydrochloride (68.51 g.; 0.363 mole) in water (720 ml.) at 0° C. in a reaction vessel where a nitrogen atmosphere is maintained. The pH of the reaction mixture is immediately adjusted to 8–9 by the addition of about 140 ml. of concentrated ammonium hydroxide. During the next 30 minutes while stirring at 5–10° C., additional concentrated ammonium hydroxide is added to maintain pH 8–9. The mixture is removed from the cooling bath and stirred at room temperature for 20 hours while maintaining a nitrogen atmosphere. The resulting yellow solid is extracted with boiling acetonitrile to remove an insoluble material, and the acetonitrile extracts are concentrated to dryness under reduced pressure. After two recrystallizations from acetic acid, there is obtained 20 g. (27%) of 3-amino-6-trifluoromethylpyrazinamide, in the form of a yellow solid, M.P. 195–196° C.

*Analysis.*—Calculated for $C_6H_5F_3N_4O$: C, 34.96; H, 2.44; F, 27.65; N, 27.18. Found: C, 35.39; H, 2.71; F, 27.53; N, 27.19.

Step B.—Preparation of 3-amino-6-trifluoromethylpyrazinoic acid

Finely ground 3-amino-6-trifluoromethylpyrazinamide (18.55 g.; 0.09 mole) and 5% aqueous sodium hydroxide (740 ml.) are mixed and heated on a steam bath with stirring for 10 minutes. The resulting yellow solution is immediately chilled in an ice bath and made acid to Congo red test paper by the addition of 6 N hydrochloric acid. After thoroughly washing with water and drying, there is obtained 17.78 g. (95%) of 3-amino-6-trifluoromethylpyrazinoic acid, in the form of a yellow solid, M.P. 185–186° C. (dec.).

This solid can be recrystallized from toluene.

*Analysis.*—Calculated for $C_6H_4F_3N_3O_2$: C, 34.79; H, 1.95; N, 20.29. Found: C, 35.10; H, 1.95; N, 20.23.

Step C.—Preparation of methyl 3-amino-6-trifluoromethylpyrazinoate

To a solution of dry hydrogen chloride gas (495 g.) dissolved in anhydrous methanol (1650 ml.), is added finely ground 3-amino-6-trifluoromethylpyrazinoic acid (16.57 g.; 0.08 mole) and the resulting yellow solution is stirred at room temperature for 19 hours. The reaction solution is concentrated to dryness under reduced pressure and the residue treated with water (150 ml.) and while cooling, made basic by the addition of excess saturated sodium bicarbonate solution. After thoroughly washing with water and drying, there is obtained 17.12 g. (97%) of methyl 3-amino-6-trifluoromethylpyrazinoate in the form of a yellow solid M.P. 194.5–196° C. One recrystallization from methanol gives the product in the form of yellow needles, M.P. 195.5–196.5° C.

*Analysis.*—Calculated for $C_7H_6F_3N_3O_2$: C, 38.02; H, 2.73; F, 25.77; N, 19.00. Found: C, 38.30; H, 2.64; F, 25.84; N, 18.91.

Step D.—Preparation of (3-amino-6-trifluoromethylpyrazinoyl)guanidine

To a solution of sodium (0.24 g.; 0.0105 mole) dissolved in anhydrous methanol (50 ml.), is added finely ground guanidine hydrochloride (1.05 g.; 0.011 mole). The mixture is stirred for 10 minutes to complete the reaction and methyl 3-amino-6-trifluoromethylpyrazinoate (2.21 g.; 0.01 mole) added. The reaction mixture is stirred at room temperature for 30 minutes and then heated under reflux for 15 minutes. The resulting solution is concentrated to a syrup under reduced pressure and the residue suspended in water, filtered and the solid washed with water. The solid free base is suspended in water (15 ml.), the pH adjusted to 3.0 by the addition of 6 N hydrochloric acid, and the mixture filtered to remove some insoluble material. The filtrate is treated with concentrated hydrochloric acid (2 ml.) and, after chilling in an ice bath, the solid hydrochloride that separates is collected by filtration. The yellow hydrochloride is dissolved in warm water (20 ml.) and the free base is precipitated by the addition of sufficient 5% aqueous sodium hydroxide to give a pH 10.0 to the supernatant solution. After thoroughly washing with water and drying, there is obtained 0.65 g. (26%) of (3-amino-6-trifluoromethylpyrazinoyl)guanidine in the form of a light yellow solid, M.P. 222–223° C. (dec.).

*Analysis.*—Calculated for $C_7H_7F_3N_6O$: C, 33.88; H, 2.84; F, 22.97; N, 33.87. Found: C, 34.20; H, 3.07; F, 22.73; N, 33.43.

The novel compounds of this invention can be compounded in any of the usual oral or parenteral dosage forms for use in therapy in the treatment of conditions resulting from an abnormal electrolyte excretion pattern of an animal organism. It will be appreciated that the dosage of each individual compound will vary over a wide range depending upon the relative potency of the selected compound and also depending upon the age and weight of the particular patient to be treated and upon the particular ailment to be treated. For these reasons, tablets, pills, capsules and the like containing for example from 25, 50, 100, 150, 200, 250, or more or less active ingredient can be made available for the symptomatic adjustment of the dosage to the individual patient. As each of the compounds of this invention can be incorporated in a dosage form similar to those described in the following examples, or any other of the usual dosage forms suitable for oral or parenteral administration, which can be prepared by well known methods, only a few examples are included herein to illustrate the preparation of representative dosage forms.

EXAMPLE 10.—COMPRESSED TABLET CONTAINING 150 MG. OF ACTIVE INGREDIENT

|  | Per tablet, mg. |
|---|---|
| (3-amino-6-bromopyrazinoyl)-guanidine | 150 |
| Calcium phosphate dibasic | 100 |
| Ethyl cellulose (as 5% solution in ethanol) | 5 |
| Unmixed granulation | 255 |
| Add: | |
| Starch, corn | 14 |
| Magnesium stearate | 1 |
| | 270 |

*Directions.*—Mix the (3 - amino-6-bromopyrazinoyl) guanidine and calcium phosphate and reduce to a No. 60 mesh powder. Granulate with Ethocel in alcohol and pass the wet granulation through a No. 10 screen. Dry the granulation at 110° F. for 12–18 hours. Dry grind to a No. 20 mesh. Incorporate the "adds" and compress into tablets each weighing 270 mg.

EXAMPLE 11.—DRY FILLED CAPSULE CONTAINING 150 MG. OF ACTIVE INGREDIENT

| | Per capsule, mg. |
|---|---|
| (3-amino-6-bromopyrazinoyl)guanidine | 150 |
| Lactose | 173 |
| Magnesium stearate | 2 |
| Mixed powders | 325 |

Mix the (3-amino-6-bromopyrazinoyl)guanidine, lactose, and magnesium stearate and reduce to a No. 60 mesh powder. Encapsulate, filling 325 mg. in each No. 2 capsule.

EXAMPLE 12.—COMPRESSED TABLET CONTAINING 150 MG. OF ACTIVE INGREDIENT

| | Per tablet, mg. |
|---|---|
| (3-amino-6-chloropyrazinoyl)guanidine | 150 |
| Calcium phosphate dibasic | 100 |
| Ethyl cellulose (as 5% solution in ethanol) | 5 |
| | 255 |
| Add: | |
| Starch, corn | 14 |
| Magnesium stearate | 1 |
| | 270 |

*Directions.*—Mix the (3-amino-6-chloropyrazinoyl)guanidine and calcium phosphate and reduce to a No. 60 mesh powder. Granulate with Ethocel in alcohol and pass the wet granulation through a No. 10 screen. Dry the granulation at 110° F. for 12–18 hours. Dry grind to a No. 20 mesh. Incorporate the "adds" and compress into tablets each weighing 270 mg.

EXAMPLE 13.—DRY FILLED CAPSULE CONTAINING 150 MG. OF ACTIVE INGREDIENT

| | Per capsule, mg. |
|---|---|
| Magnesium stearate | 2 |
| (3-amino-6-chloropyrazinoyl)guanidine | 150 |
| Lactose | 173 |
| Mixed powders | 325 |

Mix the (3-amino-6-chloropyrazinoyl)guanidine, lactose, and magnesium stearate and reduce to a No. 60 mesh powder. Encapsulate, filling 325 mg. in each No. 2 capsule.

EXAMPLE 14.—COMBINATION DOSAGE FORM IN DRY FILLED CAPSULE

| | Per capsule, mg. |
|---|---|
| (3-amino-6-chloropyrazinoyl)guanidine | 150 |
| Hydrochlorothiazide | 50 |
| Magnesium stearate | 2 |
| Lactose | 123 |
| Mixed powders | 325 |

Mix all of the above ingredients, reduce to a No. 60 mesh powder and encapsulate, filling 325 mg. in each No. 2 capsule.

EXAMPLE 15.—COMBINATION DOSAGE FORM IN DRY FILLED CAPSULE

| | Per capsule, mg. |
|---|---|
| (3-amino-6-chloropyrazinoyl)guanidine | 150 |
| 4'-methyl-6-chloro-7-sulfamylspiro-[1,2,4-benzothiadiazine-3(4H),1'-cyclohexane]-1,1-dioxide | 5 |
| Magnesium stearate | 2 |
| Lactose | 168 |
| Mixed powders | 325 |

Mix all of the above ingredients, reduce to a No. 60 mesh powder and encapsulate, filling 325 mg. in each No. 2 capsule.

EXAMPLE 16.—COMBINATION DOSAGE FORM IN DRY FILLED CAPSULE

| | Per capsule, mg. |
|---|---|
| (3-amino-6-chloropyrazinoyl)guanidine | 150 |
| Trichloromethiazide | 5 |
| Magnesium stearate | 2 |
| Lactose | 168 |
| Mixed powders | 325 |

Mix all of the above ingredients, reduce to a No. 60 mesh powder and encapsulate, filling 325 mg. in each No. 2 capsule.

EXAMPLE 17.—COMBINATION DOSAGE FORM IN DRY FILLED CAPSULE

| | Per capsule, mg. |
|---|---|
| (3-amino-6-chloropyrazinoyl)guanidine | 150 |
| 3-cyclopentylmethyl-6-chloro-7-sulfamyl 3,4-dihydro-1,2,4-benzothiadiazine-1,1-dioxide | 0.5 |
| Magnesium stearate | 2 |
| Lactose | 172.5 |
| Mixed powders | 325 |

Mix all of the above ingredients, reduce to a No. 60 mesh powder and encapsulate, filling 325 mg. in each No. 2 capsule.

EXAMPLE 18.—COMBINATION DOSAGE FORM IN DRY FILLED CAPSULE

| | Per capsule, mg. |
|---|---|
| (3-amino-6-chloropyrazinoyl)guanidine hydrochloride | 175.5 |
| 4-(2-methylenebutyryl)-2,3-dichlorophenoxyacetic acid | 100 |
| Magnesium stearate | 2 |
| Lactose | 73.5 |
| Mixed powders | 351 |

Mix all of the above ingredients, reduce to a No. 60 mesh powder and encapsulate, filling 351 mg. in each No. 2 capsule.

EXAMPLE 19.—COMBINATION DOSAGE FORM IN DRY FILLED CAPSULE

| | Per capsule, mg. |
|---|---|
| (3-amino-6-chloropyrazinoyl)guanidine | 150 |
| Acetazolamide | 250 |
| Magnesium stearate | 2 |
| Mixed powders | 402 |

Mix all of the above ingredients, reduce to a No. 60 mesh powder and encapsulate, filling 402 mg. in each No. 0 capsule.

EXAMPLE 20.—COMBINATION DOSAGE FORM IN DRY FILLED CAPSULE

| | Per capsule, mg. |
|---|---|
| (3-amino-6-chloropyrazinoyl)guanidine | 150 |
| Chlormerodrin | 18.3 |
| Magnesium stearate | 2 |
| Lactose | 154.7 |
| Mixed powders | 325 |

Mix all of the above ingredients, reduce to a No. 60 mesh powder and encapsulate, filling 325 mg. in each No. 2 capsule.

EXAMPLE 21.—COMBINATION DOSAGE FORM IN DRY FILLED CAPSULE

| | Per capsule, mg. |
|---|---|
| (3-amino-6-chloropyrazinoyl)guanidine | 150 |
| Dichlorphenamide | 100 |
| Lactose | 73 |
| Magnesium stearate | 2 |
| Mixed powders | 325 |

Mix all of the above ingredients, reduce to a No. 60 mesh powder and encapsulate, filling 325 mg. in each No. 2 capsule.

EXAMPLE 22.—COMBINATION DOSAGE FORM IN DRY FILLED CAPSULE

| | Per capsule, mg. |
|---|---|
| (3-amino-6-chloropyrazinoyl)guanidine | 150 |
| Chlorthalidone | 100 |
| Lactose | 73 |
| Magnesium stearate | 2 |
| Mixed powders | 325 |

Mix all of the above ingredients, reduce to a No. 60 mesh powder and encapsulate, filling 325 mg. in each No. 2 capsule.

EXAMPLE 23.—COMBINATION DOSAGE FORM IN DRY FILLED CAPSULE

| | Per capsule, mg. |
|---|---|
| (3-amino-6-chloropyrazinoyl)guanidine | 150 |
| Magnesium stearate | 2 |
| Chlorazinil | 300 |
| Mixed powders | 452 |

Mix all of the above ingredients, reduce to a No. 60 mesh powder and encapsulate, filling 452 mg. in each No. 0 capsule.

EXAMPLE 24.—COMBINATION DOSAGE FORM IN DRY FILLED CAPSULE

| | Per capsule, mg. |
|---|---|
| (3-amino-6-chloropyrazinoyl)guanidine hydrochloride | 175.5 |
| Magnesium stearate | 2 |
| Lactose | 147.5 |
| Mixed powders | 325 |

Mix all of the above ingredients, reduce to a No. 60 mesh powder and encapsulate, filling 325 mg. in each No. 2 capsule.

The above formulations can be employed to prepare compressed tablets of the other novel compounds of this invention hereinbefore described.

It is also contemplated to combine two or more of the compounds of this invention in a unit dosage form or to combine one or more of the compounds with other known diuretic agents or hypotensive agents or steroids or with other desired therapeutic agents in dosage unit form.

While the above examples describe the preparation of certain compounds which are illustrative of the novel compounds of this invention, and certain specific dosage forms suitable for administering the novel compounds, it is to be understood that the invention is not to be limited to the specific compounds described in the examples or by the specific reaction conditions described for the preparation of these compounds or by the specific ingredients included in the pharmaceutical preparations, but is to be understood to embrace variations and modifications thereof which fall within the scope of the appended claims.

We claim:

1. A method of modifying the excretion pattern of electrolytes of an animal organism comprising administering to said animal a compound selected from the group consisting of a nuclearly halogenated (3-amino-pyrazinoyl)guanidine wherein the halogen substituent is attached to only one of the positions 5 and 6 and a non-toxic pharmaceutically acceptable salt thereof at a dosage of between about 25 mg./day and about 250 mg./day expressed as the equivalent of base.

2. A method for reducing the amount of drug-induced excretion of potassium ions from an animal organism whose potassium excretion has been abnormally enhanced by the administration of agents known to enhance potassium excretion comprising administering to said animal a compound selected from the group consisting of a nuclearly halogenated (3-aminopyrazinoyl)guanidine wherein the halogen substituent is attached to only one of the positions 5 and 6 and a non-toxic pharmaceutically acceptable salt thereof at a dosage of between about 25 mg./day and about 250 mg./day expressed as the equivalent of base.

3. A method for reducing the amount of drug-induced excretion of potassium ions from an animal organism whose potassium excretion has been abnormally enhanced by the administration of agents known to enhance potassium excretion comprising administering to said animal a compound selected from the group consisting of (3-amino-6-bromopyrazinoyl)guanidine and a non-toxic pharmaceutically acceptable salt thereof at a dosage of between about 25 mg./day and about 250 mg./day expressed as the equivalent of base.

4. A method for reducing the amount of drug-induced excretion of potassium ions from an animal organism whose potassium excretion has been abnormally enhanced by the administration of agents known to enhance potassium excretion comprising administering to said animal a compound selected from the group consisting of (3-amino-6-chloropyrazinoyl)guanidine and a non-toxic pharmaceutically acceptable salt thereof at a dosage of between about 25 mg./day and about 250 mg./day expressed as the equivalent of base.

5. A method for reducing the amount of drug-induced excretion of potassium ions from an animal organism whose potassium excretion has been abnormally enhanced by the administration of agents known to enhance potassium excretion comprising administering to said animal a compound selected from the group consisting of (3-amino-6-iodopyrazinoyl)guanidine and a non-toxic pharmaceutically acceptable salt thereof at a dosage of between about 25 mg./day and about 250 mg./day expressed as the equivalent of base.

6. A method for reducing the amount of drug-induced excretion of potassium ions from an animal organism whose potassium excretion has been abnormally enhanced by the administration of agents known to enhance potassium excretion comprising administering to said animal a compound selected from the group consisting of (3-amino-6-trifluoromethylpyrazinoyl)guanidine and a non-toxic pharmaceutically acceptable salt thereof at a dosage of between about 25 mg./day and about 250 mg./day expressed as the equivalent of base.

7. A pharmaceutical composition suitable for use in modifying the excretion pattern of electrolytes of an animal organism comprising as the essential ingredients a therapeutic agent known to abnormally modify the excretion pattern of electrolytes of an animal organism and a compound selected from the group consisting of a nuclearly halogenated (3-aminopyrazinoyl)guanidine wherein the halogen substituent is attached to only one of the positions 5 and 6 and a non-toxic pharmaceutically acceptable salt thereof.

No references cited.

JULIAN S. LEVITT, *Primary Examiner.*

MARTIN J. COHEN, *Assistant Examiner.*